(12) United States Patent
Toth et al.

(10) Patent No.: US 7,341,257 B2
(45) Date of Patent: Mar. 11, 2008

(54) INTEGRATED SENSOR-SEAL MODULE FOR DETECTING ANGULAR POSITION OF A CRANKSHAFT

(75) Inventors: David M. Toth, Brighton, MI (US); Richard E. Dewald, Clinton, MI (US); Bhawani Tripathy, Ann Arbor, MI (US)

(73) Assignee: Federal-Mogul World Wide, Inc, Southfield, MI (US)

( * ) Notice: Subject to any disclaimer, the term of this patent is extended or adjusted under 35 U.S.C. 154(b) by 97 days.

(21) Appl. No.: 11/108,028

(22) Filed: Apr. 15, 2005

(65) Prior Publication Data

US 2005/0230920 A1  Oct. 20, 2005

Related U.S. Application Data

(60) Provisional application No. 60/562,617, filed on Apr. 15, 2004.

(51) Int. Cl.
*F16J 15/32* (2006.01)
*F16C 32/00* (2006.01)
*G01P 3/48* (2006.01)

(52) U.S. Cl. .................. 277/551; 277/572; 384/448; 324/174

(58) Field of Classification Search ............... 277/549, 277/551, 572–577; 324/174; 384/448
See application file for complete search history.

(56) References Cited

U.S. PATENT DOCUMENTS

| | | | |
|---|---|---|---|
| 4,653,458 A | * | 3/1987 | Bergsten ..................... 123/612 |
| 4,946,296 A | * | 8/1990 | Olschewski et al. ........ 384/448 |
| 5,004,358 A | * | 4/1991 | Varvello et al. ............ 384/446 |
| 5,123,661 A | * | 6/1992 | Johnston et al. ............ 277/575 |
| 5,431,413 A | | 7/1995 | Hajzler |
| 5,553,866 A | * | 9/1996 | Heinzen ..................... 277/551 |
| 5,570,013 A | | 10/1996 | Polsky et al. |
| 5,611,545 A | | 3/1997 | Nicot |
| 5,611,548 A | | 3/1997 | Dahlhaus |
| 5,648,614 A | | 7/1997 | Martsfeld et al. |
| 6,250,637 B1 | | 6/2001 | Oricchio |
| 6,345,825 B1 | * | 2/2002 | Guth et al. .................. 277/317 |
| 6,561,518 B1 | | 5/2003 | Lutaud |
| 6,605,938 B1 | * | 8/2003 | Sentoku et al. ............. 324/174 |
| 6,637,754 B1 | | 10/2003 | Ohtsuki et al. |
| 6,682,076 B1 | | 1/2004 | Hosoda et al. |
| 6,682,221 B2 | | 1/2004 | Rutter et al. |
| 2004/0086212 A1 | | 5/2004 | Ohtsuki et al. |

* cited by examiner

*Primary Examiner*—Vishal Patel
(74) *Attorney, Agent, or Firm*—Robert L. Stearns; Dickinson Wright PLLC

(57) ABSTRACT

A shaft seal/position sensor module assembly includes a carrier body that is mountable on a shaft housing about an opening through which a rotatable shaft extends. A sleeve is mountable on the shaft and carries a multi-pole encoder ring having a radially outwardly facing sensor surface. A magneto-resistive sensor is mounted on said carrier body in position to communicate with said sensor surface of said encoder ring.

8 Claims, 5 Drawing Sheets

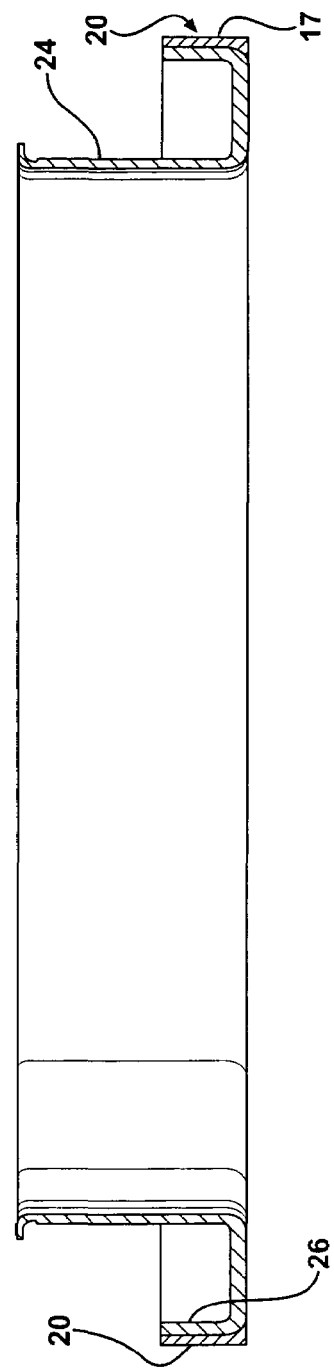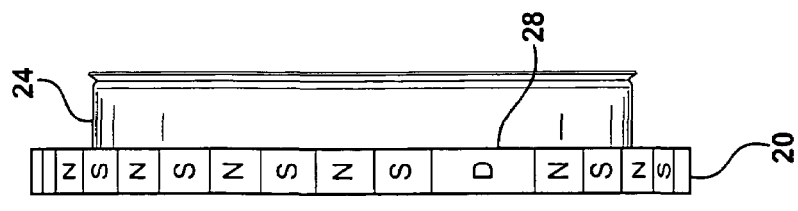

INTEGRATED SENSOR-SEAL MODULE FOR DETECTING ANGULAR POSITION OF A CRANKSHAFT

This application claims priority to U.S. Provisional Patent Application Ser. No. 60/562,617, filed Apr. 15, 2004.

BACKGROUND OF THE INVENTION

1. Technical Field

The present invention generally relates to an integrated sensor-seal module for detecting angular position of a crankshaft.

2. Related Art

There are a variety of position-sensing devices available to detect the rotational movement of a shaft, including use of multi-pole magnetic encoder rings which rotate with the shaft relative to a magneto-resistive sensor mounted on a housing of the shaft. It is also common to provide a dynamic seal that is operative to provide a fluid-tight seal across the annular gap between the rotating shaft and the opening in the shaft housing through which the shaft extends. Prior U.S. Pat. No. 6,345,825 is an example of a system having both sealing and position sensing features, but one in which the position sensor is provided as part of the shaft housing and not the seal assembly. Prior U.S. Pat. No. 5,611,545 discloses somewhat of a modular seal/position sensing arrangement, but it is particularly adapted for use as a bearing seal and does not appear to be very compact and robust nor adaptable to sensing arrangements where the encoder ring presents a radially outwardly facing sensor surface.

SUMMARY OF THE INVENTION AND ADVANTAGES

A shaft seal assembly according to one aspect of the invention includes a carrier body having an opening and mounting features to enable the carrier body to be mounted on a housing about an opening through which a rotatable shaft extends. A sleeve member is mounted on and is rotatable with the shaft relative to the carrier body. An annular dynamic seal is mounted on the carrier body and extends radially inwardly of the carrier body opening. A multi-pole encoder ring is secured to the sleeve and has a radially outwardly facing sensor surface. A magneto-resistive sensor is mounted on the carrier body and communicates with the sensing surface of the encoder ring to detect angular movement of the sleeve.

The invention has the advantage of providing a modular seal/position sensor that is compact and robust.

According to another aspect of the invention, a labyrinth seal is formed between the radially outer sensing surface of the encoder ring and the carrier body and sensor. In this compact design, the sensor forms part of the labyrinth seal path by occupying a space in the carrier body that would otherwise be provided with carrier body material, thereby reducing the size and mass of the overall module assembly.

According to a further aspect of the invention, the multi-pole encoder ring is preferably formed with at least one dead pole, although this is optional.

THE DRAWINGS

Advantages of the present invention will be readily appreciated as the same becomes better understood by reference to the following detailed description when considered in connection with the accompanying drawings wherein:

FIG. 4 is a side view illustrating, in particular, various poles of the multi-pole encoder;

FIG. 5 is a cross-sectional view of the encoder;

Figure 7:
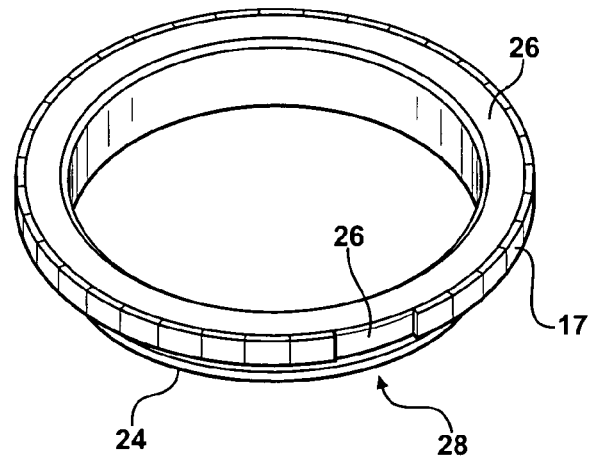
Figure 8:
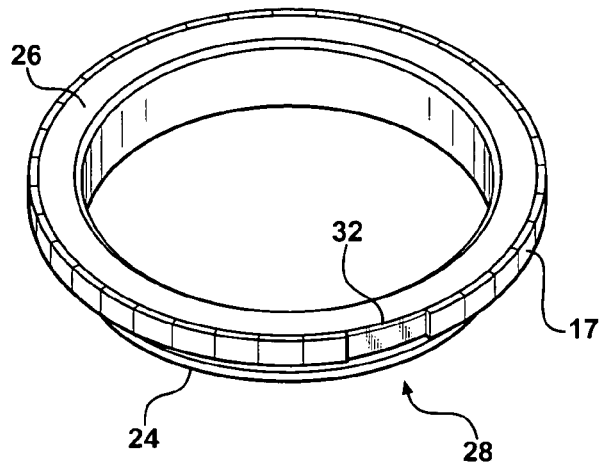

FIG. 7 is a perspective view of an alternative sensor ring illustrating establishment of the dead pole by entirely eliminating a particular compound from the wear sleeve of the sensor ring; and FIG. 8 is a perspective view of another alternative sensor ring illustrating establishment of the dead pole by reducing a thickness of the compound at the location of the dead pole relative to the remaining poles.

DETAILED DESCRIPTION

Referring to the Figures, wherein like numerals indicate like or corresponding parts throughout the several views, a seal assembly or integrated sensor-seal module is generally shown at 10. For descriptive purposes only, the integrated sensor-seal module 10 is hereinafter simply referred to as the integrated module 10. The integrated module 10 is disposed about a crankshaft of a vehicle. More specifically, the integrated module 10 is disposed about the crankshaft and is in sealing contact with an engine block of the vehicle. As such, the integrated module 10 prevents contaminants from infiltrating the engine block. The crankshaft and engine block are not illustrated in the Figures. The module 10 is applicable to other shaft/housing arrangements where the shaft extends through an opening in the housing which is to be dynamically sealed and where the rotational movement of the shaft is to be sensed.

The integrated module 10 is utilized to detect an angular position of the crankshaft. Detection of the angular position of the crankshaft is important for a variety of reasons. For instance, signals indicative of the angular position of the crankshaft are generated and communicated to an engine control module (ECM) of the vehicle to control such engine applications as fuel injection control, ignition timing control, and engine misfire control.

Figure 1:
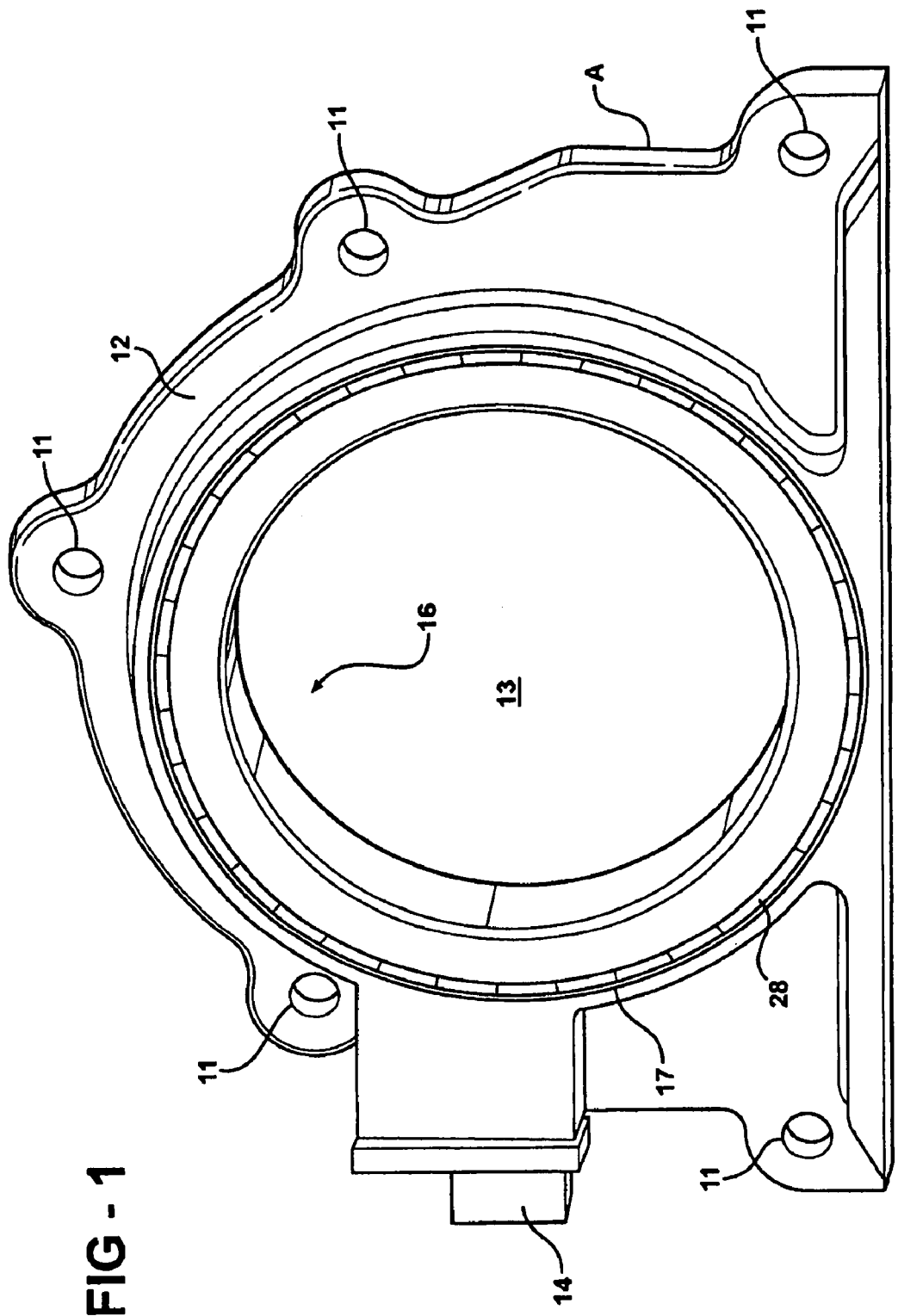
FIGS. 1-3 are perspective views of an integrated sensor-seal module according to the present invention.
Figure 2:
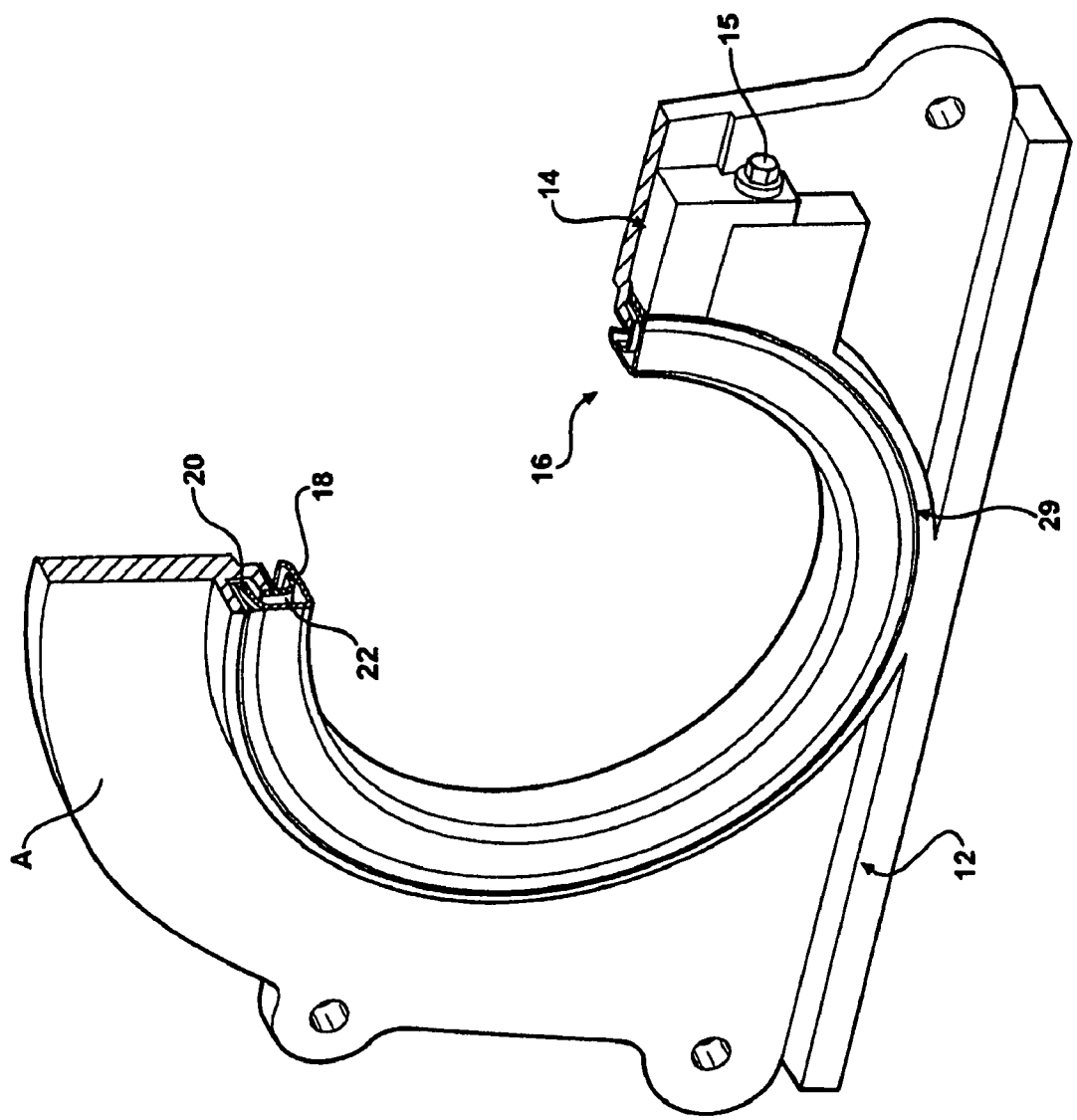
Figure 3:
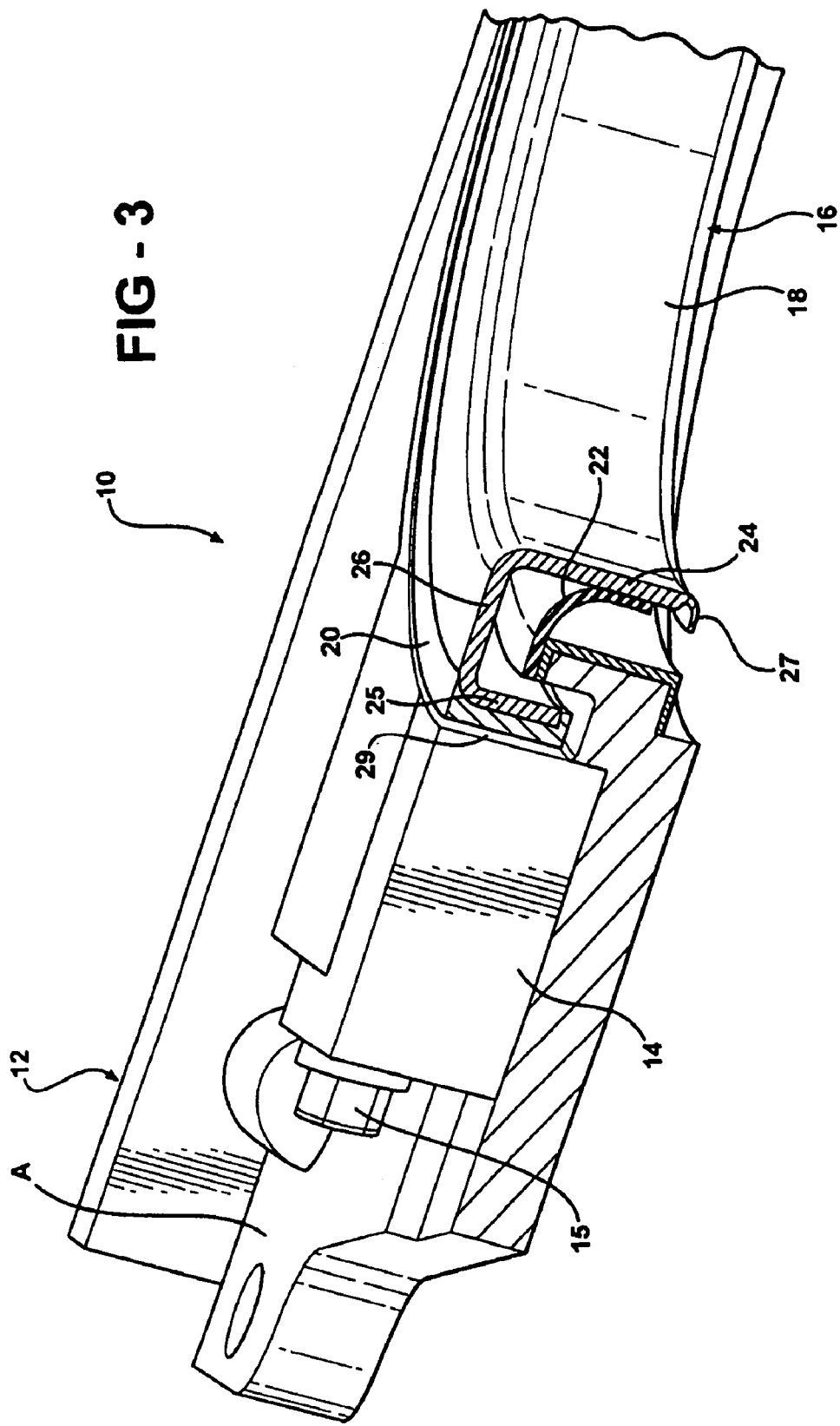

Referring primarily to FIGS. 1-3, the integrated module 10 generally includes a carrier body 12, a Magneto-Resistive (MR) sensor 14, and a sensor ring 16. The sensor ring 16 more specifically includes a wear sleeve 18 and a multi-pole encoder ring 20 and is described additionally below.

The carrier body 12 is mountable on the engine block via mounting features such as bolt holes 11 and defines an opening 13 aligned with an opening of the engine block and through which the rotatable crankshaft extends. A statically stressed seal is bonded to the carrier body 12 and is clamped between the carrier body 12 and the engine block when the carrier body 12 is installed to provide a fluid-tight static seal therebetween. A dynamic shaft seal, preferably a polytetrafluorethylene (PTFE) seal 22, is bonded to the carrier body 12 and is in operative sealing engagement with the rotating shaft to preclude the escape of lubrication from the engine block.

The MR sensor 14 is mounted, preferably via a bolt 15, at an outer periphery of the carrier body 12 such that the MR sensor 14 remains fixed relative to the carrier body 12. In this position, the MR sensor 14 interacts with the sensor ring 16, specifically with a radially outwardly facing sensor surface 17 of the multi-pole encoder 20 of the sensor ring 16, to detect the angular position of the crankshaft as described additionally below.

As best shown in FIGS. 2 and 5, the sensor ring 16 includes the wear sleeve 18 which is press fit onto the crankshaft and rotates with the crankshaft. As illustrated in FIGS. 5-8, the wear sleeve 18 includes a base portion or annular sleeve body 24 and an outer peripheral flange portion 26 which extends radially outwardly of the sleeve body 24 and terminates in an annular leg 25 which extends axially parallel to the sleeve body 24 and is preferably turned to extend axially inwardly of the end flange 26 in radially outwardly spaced overlying relation to the base portion 24. The base portion 24 is turned up at its oil side end to define an end flange 27 that effectively captures the wear sleeve 18 on the seal 22 between the flanges 26, 27 to thereby unitize the wear sleeve 18 and the carrier body 12. The dynamic shaft seal 22 preferably encircles and engages the exposed outside running surface of the base portion 24 to establish a dynamic seal. The multi-pole encoder 20 is bonded to the outer peripheral flange portion 26 of the wear sleeve 18, and particularly the leg 25, and thus rotates with the wear sleeve 18 and the crankshaft. The carrier body 12, including the dynamic shaft seal 22 and the sensor 14, and the sensor ring 16, including the wear sleeve 18 and the multi-pole encoder 20, cooperate to form an integral labyrinth seal 29 that excludes contaminants from reaching the PTFE seal 22 which, as described above, is in sealing contact with the crankshaft. The labyrinth seal 29 is on the air side A of the carrier body 12. The sensor 14 is not only used to sense rotational movement of the encoder 20, but is built into the carrier body 12 in such a way that the sensor 14 forms part of the labyrinth seal 29. A radially inner-most portion of the sensor 14 that communicates with the encoder ring 20 is preferably substantially flush with the edge of the opening 13 of the carrier body 12 on the air side A, as best shown in FIGS. 2 and 3. An axially outer-most surface of the sensor 20 on the air side A is substantially flush with an outer-most surface of the carrier body 12, such that said sensor 20 does not extend substantially beyond the air side A of the carrier body 12.

The multi-pole encoder 20 defines alternating North-South poles about the outer peripheral flange portion 26 of the wear sleeve 18. The dead pole is designated throughout as reference numeral 28. A dead pole is a low enough energy (or flux) pole that it does not trigger a change in a digital output of the MR sensor 14. The dead pole 28 is preferred but not required. Preferably, the outer peripheral flange portion 26 is coated with a compound that includes a polymeric, or elastomeric, material and magnetic particles. The compound is strategically distributed about the circumference of the outer peripheral flange portion 26 to establish the North-South poles. The magnetic particles are preferably based on strontium ferrite which is present in the compound at approximately 35-65% by volume based on the total volume of the compound. The remainder of the compound is the polymeric or elastomeric material.

Figure 6:
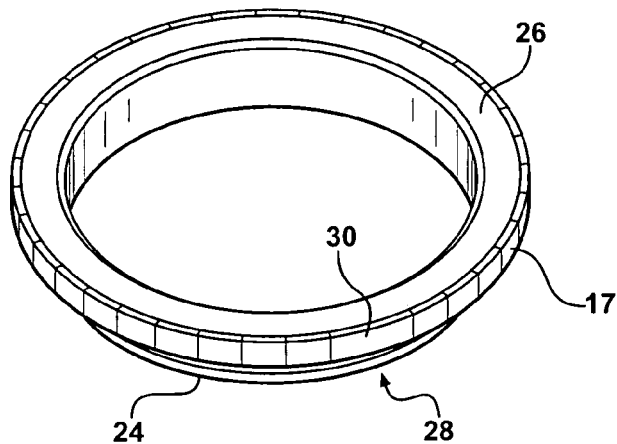
FIG. 6 is a perspective view of the sensor ring illustrating an element molded into the multi-pole encoder to establish a dead pole.

If included, the dead pole 28 has a different magnetization relative to any of the other poles, i.e., the North and South poles. The dead pole 28 is recognized by the MR sensor 14 and utilized by the ECM 17 as a control reference location on the multi-pole encoder 20, typically indicating a top dead center (TDC) for a particular piston within a cylinder of the engine block. Recognition of the TDC is important in the control of the various engine applications. Referring now to FIGS. 6-8, the dead pole 28 can be introduced into the multi-pole encoder 20 in a variety of different manners. For example, the dead pole 28 can be established by specifically molding an element 30 into the multi-pole encoder 20 that possesses the different magnetization (FIG. 6). Alternatively, the dead pole 28 can be established by entirely eliminating the compound from the outer peripheral flange portion 26 of the wear sleeve 18 such that the material of construction of the wear sleeve 18 is actually exposed (FIG. 7). In a further example, the dead pole 28 can be established by reducing, rather than entirely eliminating, a thickness 32 of the compound at the location of the dead pole 28 relative to the remaining poles, i.e., the North and South poles (FIG. 8).

As mentioned above, the MR sensor interacts, or communicates, with the sensor ring 16 of the integrated module 10. More specifically, as the crankshaft rotates, the sensor ring 16, including the wear sleeve 18 and the multi-pole encoder 20, also rotates. The MR sensor 14 appreciates variances in a magnetic field that result from this rotation. The MR sensor 14 generates signals and the ECM can interpret these signals to determine the angular position of the crank shaft as is appreciated by those skilled in the art.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A shaft seal assembly, comprising:
    a carrier body having an axially outer-most surface and a circumferentially extending annular surface providing an opening with a pocket extending radially outwardly from said opening into said axially outer-most surface and having mounting features to enable said carrier body to be mounted on a housing about an opening of the housing through which a rotatable shaft extends;
    an annular dynamic seal mounted on said carrier body extending-radially inwardly of said opening of said carrier body;
    a sleeve member mountable on and rotatable with the shaft relative to said carrier body and said dynamic seal;
    a multi-pole encoder ring secured to said sleeve and having a radially outwardly facing signal surface;
    a magneto-resistive sensor mounted on said carrier body in said pocket and having a radially inwardly facing sensor surface arranged substantially flush with said annular surface of said carrier body and exposed in unobstructed open communication with said radially outwardly facing signal surface of said encoder ring and having an axially outer-most surface arranged substantially flush with said axially outer-most surface of said carrier body on an air side of said shaft seal assembly; and
    wherein a labyrinth seal is provided having a radially facing inner surface with a constant first diameter formed at least in part by said signal surface of said encoder ring, and a radially facing outer surface having a constant second diameter that is greater than said first diameter, said outer surface being formed at least in part by said sensor surface and said annular surface of said carrier body, said labyrinth seal having a substantially continuous circumferential width across said radially facing inner and outer surfaces and being in open communication with the air side of said shaft seal assembly.

2. The seal assembly of claim 1 wherein said sleeve includes an annular sleeve body, a radially outwardly extending flange and an annular leg projecting axially inwardly from said flange in overlapping relation with said sleeve body to provide said sleeve with a u-shape in axial cross-section, said encoder ring being mounted on said leg.

3. The seal assembly of claim 1, wherein said dynamic seal comprises a PTFE seal.

4. The seal assembly of claim 2, wherein said dynamic seal engages said annular sleeve body.

5. The seal assembly of claim 1, wherein said mounting features include bolt holes for enabling said carrier body to be bolted on to the housing.

6. The seal assembly of claim 1, wherein said sensor is bolted to said carrier body.

7. The seal assembly of claim 2, wherein the sleeve member is captured axially in said opening of said carrier body in both directions by said radially outwardly extending flange provided on the air side of said seal assembly and an opposite end flange provided on an oil side of said seal assembly in position to confront said dynamic seal.

8. The seal assembly of claim 1, wherein said encoder ring includes at least one dead pole.

* * * * *